United States Patent [19]
Nagao et al.

[11] Patent Number: 4,810,894
[45] Date of Patent: Mar. 7, 1989

[54] METHOD AND APPARATUS FOR MEASURING FILM THICKNESS USING A SECOND SHEET OF KNOWN THICKNESS

[75] Inventors: Toshishige Nagao; Masayuki Ariki; Yoshiaki Ida, all of Hyogo, Japan

[73] Assignee: Mitsubishi Denki Kabushiki Kaisha, Tokyo, Japan

[21] Appl. No.: 43,722

[22] Filed: Apr. 29, 1987

[30] Foreign Application Priority Data

Apr. 29, 1986 [JP] Japan ................................ 61-100066

[51] Int. Cl.[4] ............................................. G01B 11/24
[52] U.S. Cl. ..................................... 250/560; 356/376
[58] Field of Search ................ 250/560, 561; 356/376, 356/381, 382, 384–387; 377/53

[56] References Cited

U.S. PATENT DOCUMENTS

| | | | |
|---|---|---|---|
| 3,518,441 | 6/1970 | Selgin | 356/381 |
| 4,311,392 | 1/1982 | Yazaki et al. | 250/560 |
| 4,532,723 | 8/1985 | Kellie et al. | 356/385 |
| 4,730,116 | 3/1988 | Ida et al. | 250/560 |

Primary Examiner—David C. Nelms
Assistant Examiner—Stephone B. Allen
Attorney, Agent, or Firm—Sughrue, Mion, Zinn, Macpeak, and Seas

[57] ABSTRACT

A film thickness measuring method and device therefor which are free from drawbacks caused by errors in a sheet conveying system and an optical system of the device and the like. The optical system is moved over a sheet having a sheet member and a film formed thereon, whose thickness is to be measured, so that the deformation of the conveying system and the optical system is detected in advance. After taking the detection results into an account, the thickness measurement is carried out resulting in improving an accuracy thereof.

7 Claims, 5 Drawing Sheets

METHOD AND APPARATUS FOR MEASURING FILM THICKNESS USING A SECOND SHEET OF KNOWN THICKNESS

FIELD OF THE INDUSTRIAL APPLICATION

This invention relates to a film thickness measuring method for measuring the thickness of a film formed, for instance, on a sheet member in a magnetic tape manufacturing line, and a device for practicing the method.

BACKGROUND OF THE INVENTION

FIG. 1 shows a film thickness measuring device which is proposed in a co-pending U.S. patent application Ser. No. 886,782 filed on July 18, 1986, now U.S. Pat. No. 4,730,116 in which priority is claimed based on Japanese Patent Application No. 174609/1985 filed on Aug. 6, 1985.

In FIG. 1, reference numeral 1 designates a rotary shaft which is rotated at a predetermined speed; 2, a light shielding board which is disposed in parallel with the rotary shaft 1 with a predetermined distance therebetween; and 3, a sheet including a sheet member and a film formed thereon having a predetermined thickness, the thickness of the film being to be measured. The sheet 3 is conveyed at a speed equal to the rotation speed of the rotary shaft 1 while being in close contact with the latter 1.

Further in FIG. 1, laser beam generators 4 and 5 are arrranged at predetermined angles with respect to each other, for producing laser beams 4a and 5a, respectively. A reflecting mirror 6 is provided to cause the laser beam 4a to scan a gap A shown in FIG. 2 between the surface of the rotary shaft 1 and the light shielding board 2. Further, the reflecting mirror 6 also causes the laser beam 5a to scan a gap B shown in FIG. 2 between the sheet 3 under measurement and the light shielding board 2. Reference numerals 7 and 8 designate lenses for converging the laser beams 4a and 5a, respectively, which have been reflected by the reflecting mirror 6; 9 and 10, lenses for converging the laser beams 4a and 5a which have scanned the gaps A and B, respectively; 11 and 12, light receiving units; 13 and 14, counters; 15, an arithmetic unit; and 16, a display unit.

The film thickness measuring device thus constructed operates as follows:

The laser beams 4a and 5a generated by the laser beam generators 4 and 5 are directed to the reflecting mirror 6, so that they are caused to scan the respective gaps A and B at the same angular velocity. The laser beams 4a and 5a reflected by the mirror 6 are converged by the lenses 7 and 8 so that they are made minimum in beam diameter at the gaps A and B, respectively, and are run in a direction perpendicular to the rotary shaft 1; i.e., in the direction of the gaps at the predetermined speed. In this operation, the light receiving units 11 and 12 receive the laser beams 4a and 5a which have passed through the gaps A and B, respectively. Accordingly, the output signals of the light receiving units 11 and 12 are pulse signals the widths of which are proportional to the dimensions of the gaps A and B. The pulse signals are counted by the counters 13 and 14, the counted values of which are applied to the arithmetic unit 15 where the thickness is calculated using the counted values. The thickness thus calculated is displayed on the display unit 16.

The thickness $t_x$ of the sheet 3 under measurement can be obtained from the following equation (1):

$$t_x = t_o(1 - b/a) \qquad \ldots (1)$$

where a is the counted value of the counter 13, b is the counted value of the counter 14, and $t_o$ is the dimension of the gap A which has been set.

The film thickness t can be obtained by subtracting the thickness $t_x$ of the sheet 3 thus calculated the thickness of the sheet member which has been known.

As described above, the film thickness measuring device shown in FIG. 1 measures the thickness of the sheet member and that of the film formed thereon by referring to the dimension of the gap between the rotary shaft and the light shielding plate as a reference value. Therefore, the film thickness measuring device suffers from difficulties that, as the rotary shaft turns, the dimension of the gap varies with time because of the eccentricity or uneven surface of the rotary shaft and accordingly the measurement value also varies: that is, the measurement is not stable nor accurate.

Further, in the case where the sheet is inserted into both of the gaps A and B to measure the thickness of the film only, or in the case where the optical system is slidingly moved, in its entirety, in the direction of a longitudinal axis of the rotary shaft so that the measurement is carried out at a given position, the gap dimension is not uniform over the length of the rotary shaft, and therefore in the measurement error may be casued as much.

SUMMARY OF THE INVENTION

In view of the above described drawbacks accompanying the device of FIG. 1 and the other prior art device, an object of the invention is provide a method and device for measuring the thickness of a film formed on a sheet member in a sheet manufacturing line such as a magnetic tape manufacturing line, which is capable of eliminating the above drawbacks.

According to the present invention, the above, and other objects of the invention is accomplished by the provision of the film thickness measuring method and device in which the optical system is moved from one end of the rotary shaft to the other end to perform measurement at several positions thereby to store the bends of the rotary shaft and the optical system holding structure, and at a position in the axial direction of the rotary shaft a reference sheet is measured once for calibration, and the gap width change is corrected.

DESCRIPTION OF THE PREFERRED EMBODIMENTS

An embodiment of the present invention will be described with reference to FIGS. 3 and 4.

Figure 1:
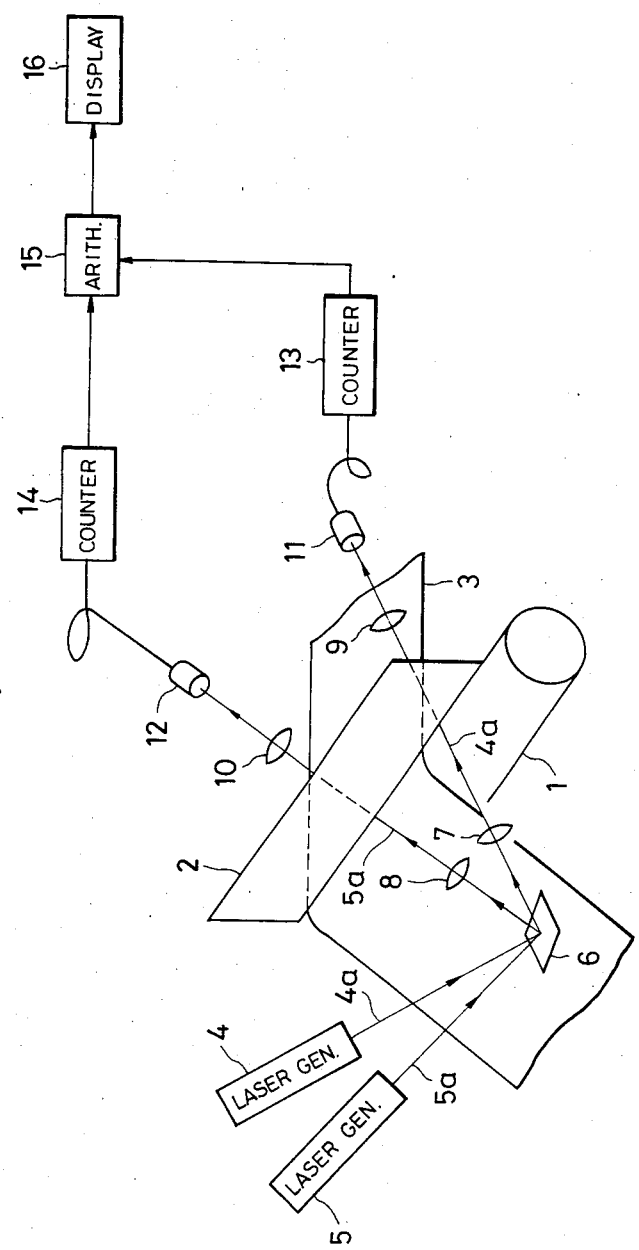
FIGS. 1 and 2 are explanatory diagrams showing the arrangement of a film thickness measuring device which has been proposed in the co-pending application.
Figure 2:
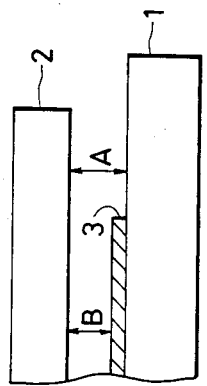
Figure 3:
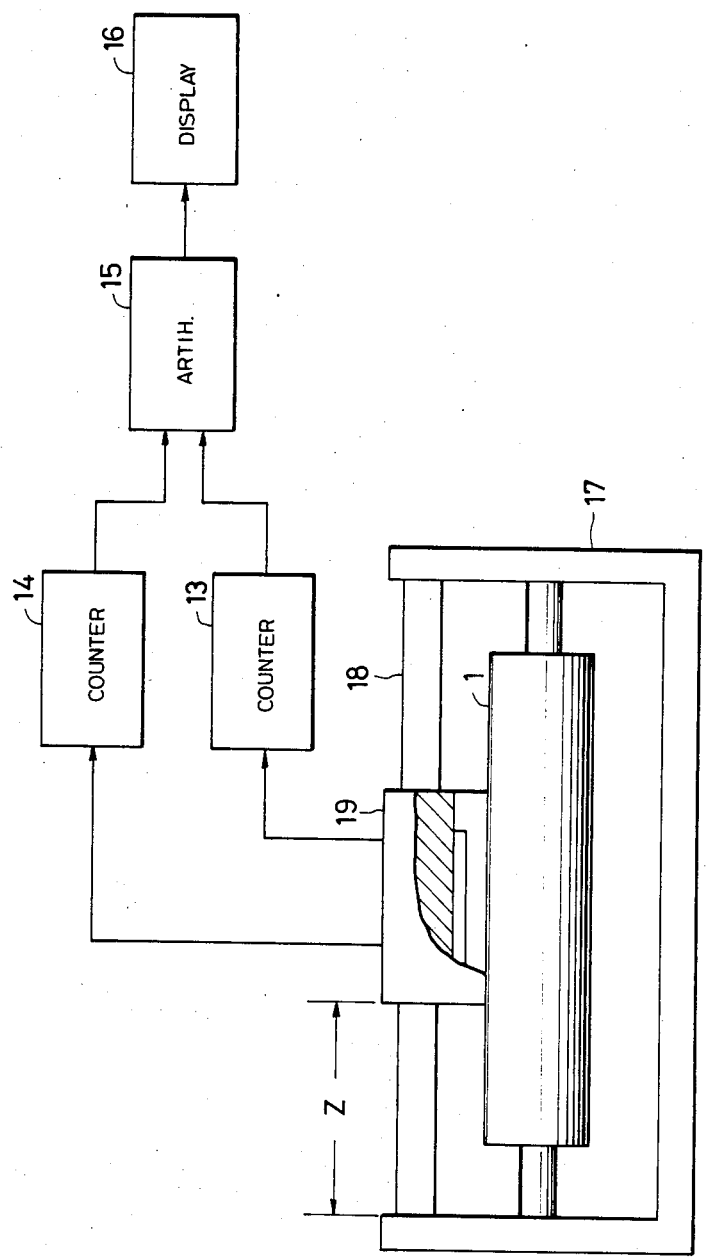
FIG. 3 is an explanatory diagram showing the arrangement of an embodiment of the present invention.
Figure 4:
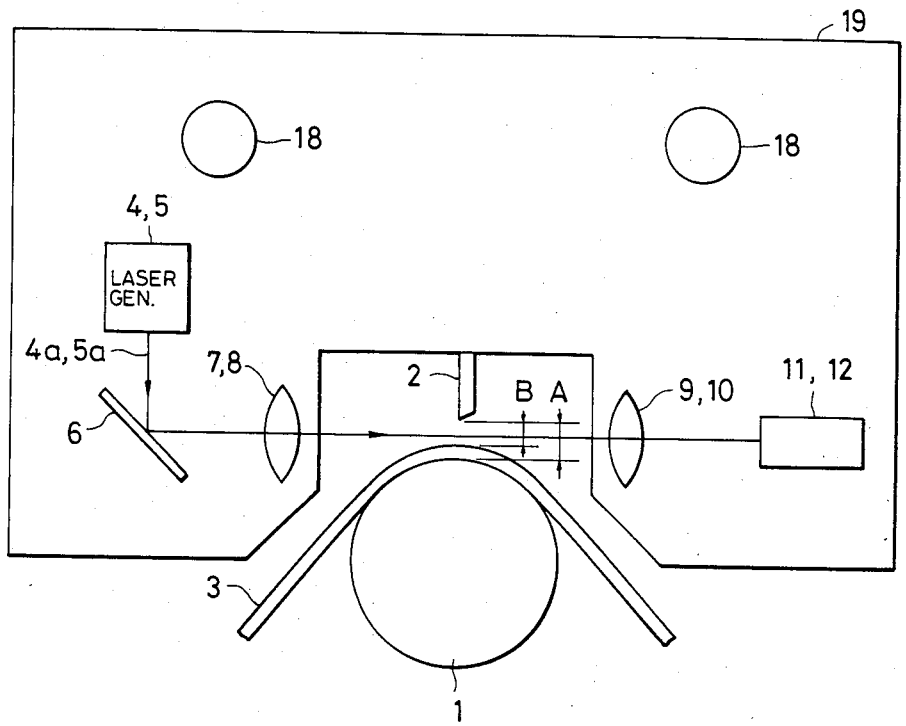
FIG. 4 is an explanatory diagram showing the arrangement of essential components in FIG. 3.

In FIGS. 3 and 4, reference numerals 1 through 16 designate those which have been already designated by the same reference numerals in FIG. 1; 17, a frame supporting the rotary shaft 1; 18, guide members supported by the frame 17 in such a mannert that they are in parallel with the rotary shaft 1; and 19, a movable unit slidably mounted on the guide member 18 in such a manner that it is movable in parallel with the rotary shaft 1. The components 2 and 4 through 12 are provided on the movable unit 19 and arranged in the same manner as those in the film thickness measuring device of FIG. 1. Reference character Z designates a distance between the movable unit 19 and a reference point on the frame 17.

The operation of the film thickness measuring device thus organized will be described.

In FIGS. 3 and 4, the gaps A and B are scanned with the laser beams 4a and 5a, and pulse signals the pulse widths of which are proportional to the gap widths are supplied to the counters 13 and 14 for time-measurement. Therefore, the counted values of the counters 13 and 14 are proportional to the pulse widths. Hereinafter, the counted values for the gaps A and B will be referred to as "counts A and B", respectively, when applicable.

Figure 5:
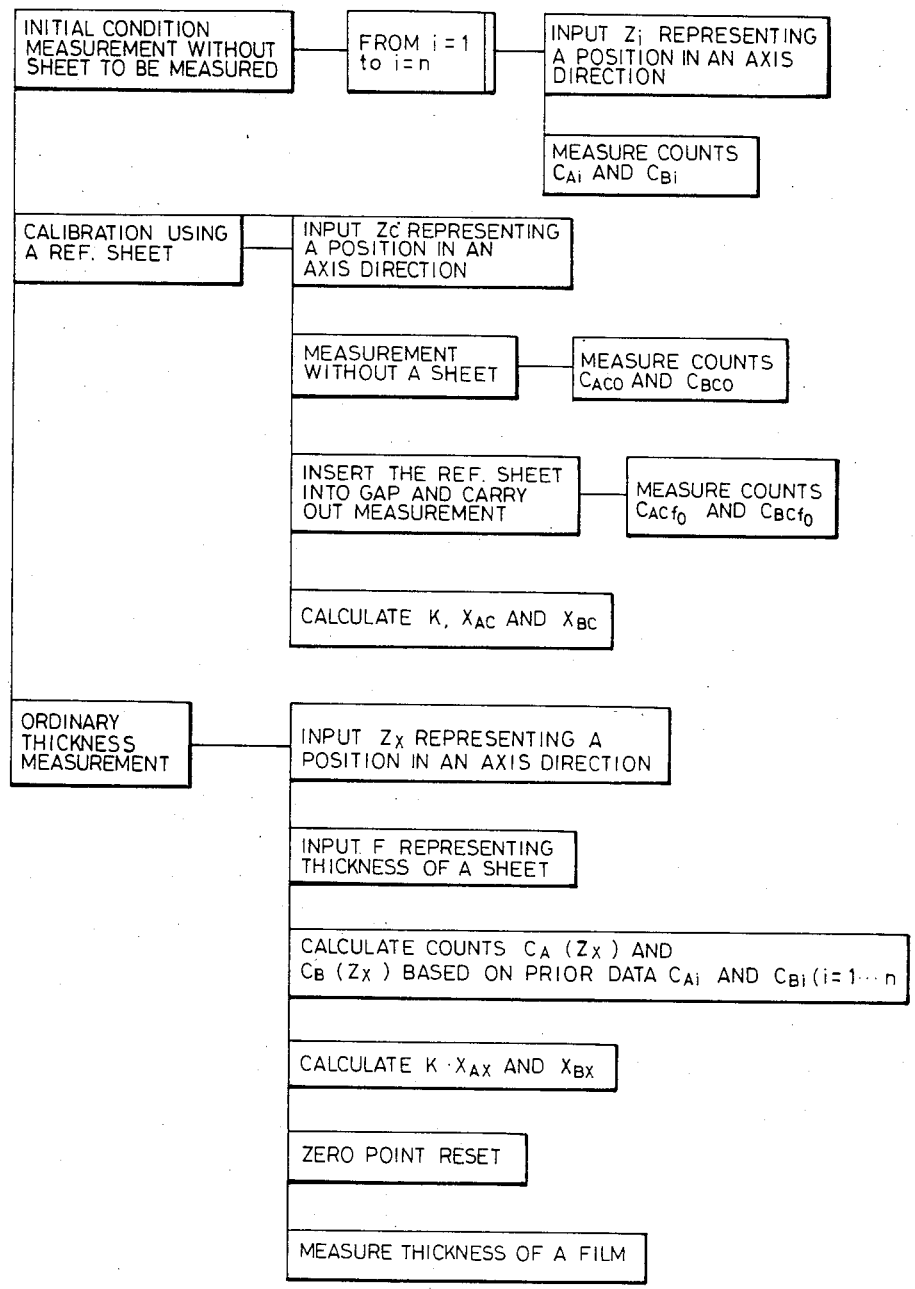
FIG. 5 is a PAD showing signal processing operations in the present inveniton.

As the movable unit 19 is moved along the guide members 18, because of the bend or deformation of the guide members 18 or the rotary shaft 1, the gaps A and B change in dimension resulting in an occurrence of variation in the counts A and B. These changes can be corrected by measuring the change of the gaps A and B in the axial direction in advance. This will be described with reference to FIG. 5 in more detail. FIG. 5 is a "PAD" showing calibration and measurement in the film thickness measuring operation, including three operation modes: (1) initial condition measurement, (2) calibration using a reference sheet, and (3) ordinary thickness measurement.

First, the initial condition measurement (1) will be described. In the measurement (1), no sheet is used. The movable unit 19 is moved from one end ($Z=Z_1$) of the guide members 18 to the other end ($Z=Z_n$) while stopping at suitable intervals, so that the counts A ($C_{A1}$ through $C_{An}$) and the counts B ($C_{B1}$ through $C_{Bn}$) are measured at n points and are stored in a memory. In this operation, the values Z ($Z_1$ through $Z_n$) representing the measurement positions are also stored in the memory by using a key board or the like (not shown). Thus, the data of the gap in the axial direction have been stored. Therefore, a counted value at a given position can be obtained by interpolation of the data, when necessary.

Next, the calibration is carried out with a reference sheet whose thickness has been known. First, the movable unit 19 is fixed at a given position ($Z=Z_c$), and the value $Z_c$ is stored in the memory using the key board or the like. Before the reference sheet is used, the count A($C_{ACO}$) and the count B($C_{BCO}$) are also stored in the memory. Under this condition, the reference sheet is inserted into the gap B, and the count A($C_{ACfo}$) and the count B($C_{BCfo}$) are then stored in the memory.

The relations between the counts A and B thus obtained and the dimensions $x_A$ and $x_B$ of the gaps A and B are as follows:

$$C_{Ai} = R_A \cdot x_{Ai} \quad (i = 1 \ldots n) \tag{2}$$

$$C_{Bi} = R_B \cdot x_{Bi} \quad (i = 1 \ldots n)$$

where $R_A$ and $R_B$ are proportional constants.

These n data are obtained at the n positions ($Z_1$ through $Z_n$), respectively. The count A ($C_A(Z)$) and the count B ($C_B(Z)$) at a given position Z which are calculated by linear interpolation of these discrete data have the same relations with the gap dimensions $x_A(Z)$ and $x_B(Z)$ as in the expression (2) above:

$$C_A(Z) = R_A \cdot x_A(Z) \tag{3}$$

$$C_B(Z) = R_B \cdot x_B(Z)$$

Furthermore, memory data $C_{ACO}$, $C_{BCO}$, $C_{ACfo}$, and $C_{BCfo}$ at the time of calbration using the reference sheet are similarly related to the gap dimensions $x_{AC}$ and $x_{BC}$ provided when no sheet is used. The relations are as indicated below:

$$C_{ACO} = R'_A \cdot x_{AC} \tag{4}$$

$$C_{ACfo} = R''_A \cdot x_{AC}$$

$$C_{BCO} = R'_B \cdot x_{BC}$$

$$C_{BCfo} = R''_B (x_{BC} - f_o)$$

where $f_o$ is the thickness dimension of the reference sheet.

In these expressions, the proportional constants $R_A$, $R_B$, $R'_A$ $R'_B$, $R''_A$ and $R''_B$ are determined with change with time taken into consideration. However, Since the scanning mechanism is used in common, the following relation (5) is established:

$$\frac{R_A}{R_B} = \frac{R'_A}{R'_B} = \frac{R''_A}{R''_B} = K \tag{5}$$

where K is a constant which is substantially equal to one (1) because the scanning mechanism is commonly used for scanning the gaps A and B.

Solving the expressions (4) and (5) for $x_{AC}$ and $x_{BC}$, $$K \cdot x_{AC} = \frac{f_o}{C_{BCO}/C_{ACO} - C_{BCfo}/C_{ACfo}} \tag{6}$$

$$x_{BC} = \frac{f_o}{1 - C_{BCfo}/C_{ACfo} \cdot C_{ACO}/C_{BCO}} \tag{7}$$

The value $K \cdot x_{AC}$ calculated from the expression (6) and the value $x_{BC}$ calculated form the expression (7) are stored in the memory. Thus, the calibration using the reference sheet has been accomplished.

Now, with the movable unit 19 fixed at a position $Z_x$, the film thickness measurement is performed. In this operation, the gap change at the position $Z_x$ in the axial direction, and the gap change attributing to the sheet thickness when only the thickness of the film on the sheet is measured are corrected so that the film thickness can be measured accurately. In the case where only the thickness of the film on the sheet is measured, the dimensions of the gaps A and B are reduced as much as the thickness F of a sheet 20 as is apparent from FIG. 6. This reduction must be corrected. Such a method of correcting the dimensions of the gaps A and B will be described.

Figure 6:
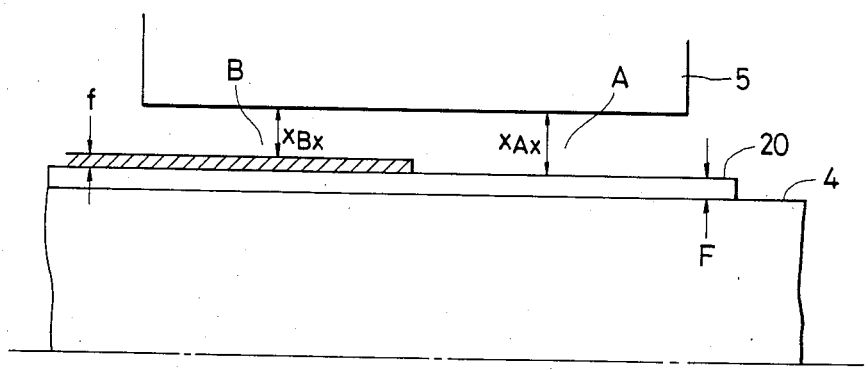
FIG. 6 is an explanatory diagram for a description of the operation of the embodiment of the present invention.

In FIG. 6, values $X_{Ax}$ and $x_{Bx}$ can be regarded as equivalet gap dimensions in the case of measuring a film thickness f only. In this case, the value $C_{Ax}$ of the count A and the value $C_{Bx}$ of the count B relate to the values $X_{Ax}$ and $x_{Bx}$, respectively, similarly as in the expressions (4) and (5):

$$C_{Ax} = R'''_A \cdot x_{Ax} \qquad (8)$$

$$C_{Bx} = R'''_B \cdot (x_{Bx} - f)$$

$$\frac{R'''_A}{R'''_B} = K$$

Therefore, $$f = -\frac{C_{Bx}}{C_{Ax}} \cdot K x_{Ax} + x_{Bx} \qquad (9)$$

This is the fundamental expression from which the film thickness f can be calculated by using the counted values.

The equivalent gap dimensions $x_{Ax}$ and $x_{Bx}$ in the expression (9) which are obtained by reducing the sheet thickness F at the position $Z_x$ can be obtained by reducing the sheet thickness F from the products of the gap dimensions $x_{AC}$ and $x_{Bc}$ at the position $Z_c$ and the ratios of the counts A and B $C_A(Z_x)$ and $C_B(Z_x)$ at the position Z and the counts A and B $C_A(Z_C)$ and $C_B(Z_c)$ at the position $Z_c$; that is, $$x_{Ax} = \frac{C_A(Z_x)}{C_A(Z_C)} \cdot x_{AC} - F \qquad (10)$$

$$x_{Bx} = \frac{C_B(Z_x)}{C_B(Z_C)} \cdot x_{BC} - F \qquad (11)$$

where $C_A(Z_x)$, $C_A(Z_c)$, $C_B(Z_x)$ and $C_B(Z_c)$ are the values which are obtained by subjecting the counts $C_{Ai}$ and $C_{Bi}$ (i=1 through n) to linear interpolation.

Mulyiplying both sides of the equation (10) by K, $$K \cdot x_{Ax} = \frac{C_A(Z_x)}{C_A(Z_C)} \cdot K x_{AC} - K \cdot F \qquad (12)$$

Strictly stating, the second term K·F in the right side of the equation (12) above is unknown; however, K·F can be replaced by F because K is nearly equal to one (1). Therefore, $$K \cdot x_{Ax} = \frac{C_A(Z_x)}{C_A(Z_C)} \cdot K \cdot x_{AC} - F \qquad (13)$$

When $x_{Bx}$ and K $x_{Ax}$ are calculated from the expressions (11) and (13), respectively, and inserted in the equation (9), then the film thickness f can be obtained by using the counts $C_{Ax}$ and $C_{Bx}$.

In FIG. 5, the "ordinary thickness measurement" reveals these operating steps.

First, the movable unit 19 is fixed at a position $Z_x$ for measurement, and the position $Z_x$ is inputted by operating the key board or the like. Next, when only the thickness of a film on a sheet is measured, the thickness F of the sheet is inputted.

Under this condition, the counts $CA(Z_x)$ and $C_B(Z_x)$ at the position $Z_x$ are calculated by subjecting the past data $C_{Ai}$ and $C_{Bi}$ (i=1, . . . and n) to linear interpolation which have been stored. At the same time, the counts $C_A(Z_C)$ and $C_B(Z_c)$ at the position $Z_c$ are calculated through linear interpolation. However, it is unnecessary to calculate these data $C_A(Z_C)$ and $C_B(Z_C)$ for every film thickness measurement; that is, they should be calculated only once at the end of the calibration using the reference sheet.

Next, the variables are inserted into the expressions (11) and (13), to calculate K $x_{Ax}$ and $x_{Bx}$ and store them in the memory. Under this condition, the sheet covered with the film to be measured is run for measurement of the counts $C_{Ax}$ and $C_{Bx}$. The film thickness is calculated from the expression (9) using the counts $C_{Ax}$ and $C_{Bx}$, and is then displayed.

By the following zero point reset, the effect of drift on the measuring system can be eliminated and the thickness of an extremely thin film can be measured with high accuracy. The zero point reset is carried out as follows: The constant K·$x_{Ax}$ and the count values obtained, for instance, at the start of measurement when the sheet on which no film is formed yet is conveyed, are inserted into the expression (9). And with f=0, the offset component $x_{Bx}$ is calculated and is then stored as $x_{Bx}$ again.

In the above-described embodiment, whenever the movable unit 19 is moved, its position is inputted with the key boardor the like. However, if the film thickness measuring device is so designed that a position detecting sensor is coupled to the mechanism for moving the movable unit 19, and the output of the sensor is automatically applied to the arithmetic unit 15, then the operation can be achieved more readily.

Further, such average values that are obtained by subjecting a plurality of counted values obtained during a certain period of time to averaging processing, may be used as counts A and B to improve the accuracy in measurement. An example of the certain period of time is the period corresponding to one rotation of the rotary shaft 1.

Figure 7:
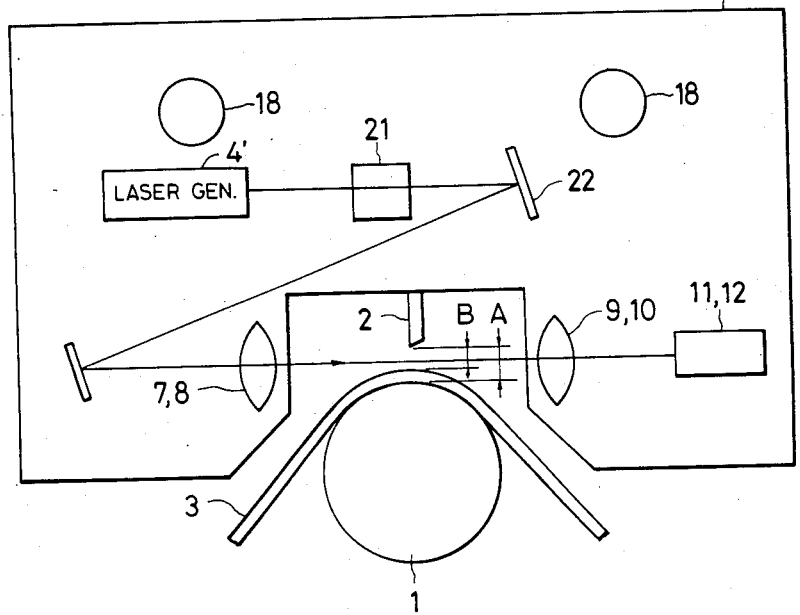
FIGS. 7 and 8 are schematic diagrams showing an example of an optical system of a device in which a single laser beam generator is employed.
Figure 8:
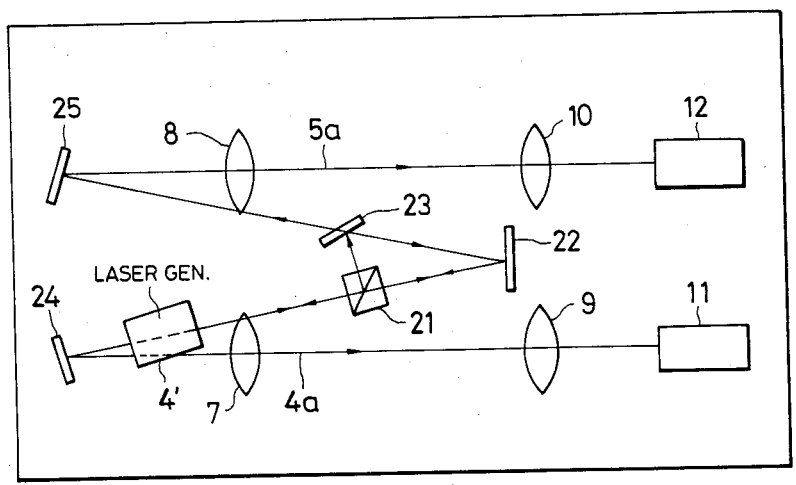

While the above described embodiment of FIG. 3 employs two separate laser beam generators 4 and 5, modifications of an optical system is possible so that a single laser beam generator is employed instead of the two generators 4 and 5 to generate laser beams 4a and 5a. An example of the optical system is as shown in FIGS. 7 and 8 in which reference numeral 4' designates a laser beam generator; 21, a beam spliter; 22, a total reflection mirror for scanning; and 23 to 25, total reflection mirrors.

As is apparent from the above, according to the present invention, under the condition that no sheet to be measured is used, the optical system is moved from one end of the rotary shaft to the other end, to measure the count numbers thereby to store the bends of the rotary shaft and the optical system holding structure, and with the movable unit set at a given position, the measurement is carried out with a reference sheet only once for calibration. In the measurement only the thickness of the sheet is inputted to perform the predetermined correcting operation to correct the gap width variation. Therefore, no matter where the movable unit is positioned, or no matter how the thickness of the sheet changes, the film thickness can be measured with high accuracy according to the invention.

What is claimed is:

1. A film thickness measuring method in which a sheet comprising a first sheet member and a film formed thereon, the thickness of which is to be measured is conveyed by a rotary shaft while being kept in close contact with said rotary shaft, a light shielding board is arranged in parallel with said rotary shaft with a predetermined distance therebetween, and a first laser beam is used to scan a gap between the surface of said film and said light shielding board while a second laser beam is used to scan a gap between said light shileding board and the surface of said rotary shaft and the part of said first sheet on which no film is formed, which comprises:

- a first step in which the gap between the surface of said rotary shaft and said light shielding member at at least one position in an axial direction of said rotary shaft is scanned with said laser beams to obtain count values and the count values and said position in the axial direction are stored in a memory;
- a second step in which a second sheet whose thickness is known is conveyed, while being kept in close contact with the surface of said rotary shaft, at the position that has been scanned by said first laser beam so as to be scanned by said laser beams to obtain second count values, and the second count values are stored in said memory;
- a third step in which positions in the axial direction of said rotary shaft where the scanning is carried out with said first laser beam, and said second sheet's thickness corresponding to said positions are stored in said memory;
- a fourth step in which a calculating equation is obtained from which the thickness of said film to be measured is calculated by using measurement data provided in said first through third steps; and
- a fifth step in which, after said first through fourth steps, scanning is carried out with said laser beams while said sheet is being conveyed, and the resultant count values are utilized to calculate the thickness of said film to be measured from said calculating equation.

2. A method as claimed in claim (1), wherein said third step, the position is inputted through a terminal unit.

3. A method as claimed in claim (1), in said third step, the position is detected by a position detector.

4. A film thickness measuring device comprising:

- a rotary shaft for supporting a sheet including a sheet member and a film formed thereon, the thickness of which is to be measured, in such a manner that said sheet is in close contact with said rotary shaft;
- a movable unit which is movable in parallel with said rotary shaft, said movable unit being stopped at a plurality of positions in an axis direction of said rotary shaft;
- a light shielding member installed on said movable unit in such a manner that said light shielding board is in parallel with said rotary shaft with a predetermined distance therebetween;
- a laser beam generating means installed on said movable unit, for producing first and second laser beams respectively;
- a scanning means mounted on said movable unit, said scanning means being so controlled as to cause said first laser beam to scan a gap between said light shielding member and the surface of said sheet to be measured which is held in close contact with said rotary shaft and to cause said second laser beam to scan a gap between said light shielding board and the surface of said rotary shaft on which no sheet is provided;
- a first light receiving means for receiving said first laser beam passed through the gap between said light shielding member and the surface of said sheet;
- a second light receiving means for receiving said second laser beam passed through the gap between said rotary shaft and said light shielding member;
- first and second counters for measuring the period of times for which said first and second light receiving units receive said first and second laser beams, respectively; and
- an arithmetic unit for calculating the thickness of said member by using outputs of said first and second counters.

5. A film thickness measuring device as claimed in claim (4) wherein said laser beam generating means comprises first and second laser beams generators.

6. A film thickness measuring device as claimed in claim (4) wherein said measurement positions are input by an external inputting means.

7. A film thickness measuring device as claimed in claim (4) wherein said measurement positions are detected by a position detecting means provided to said rotary shaft.

* * * * *